United States Patent
Tai

(10) Patent No.: US 8,290,352 B2
(45) Date of Patent: Oct. 16, 2012

(54) METHOD FOR RECOVERING DATA IN DISK

(75) Inventor: Wen-Pin Tai, Hsinchu (TW)

(73) Assignee: Sunplus Technology Co., Ltd., Hsinchu (TW)

(*) Notice: Subject to any disclaimer, the term of this patent is extended or adjusted under 35 U.S.C. 154(b) by 1202 days.

(21) Appl. No.: 12/113,953

(22) Filed: May 2, 2008

(65) Prior Publication Data
US 2009/0129227 A1 May 21, 2009

(30) Foreign Application Priority Data
Nov. 21, 2007 (TW) .............................. 96144111 A

(51) Int. Cl.
*H04N 5/783* (2006.01)
(52) U.S. Cl. .................... 386/344; 386/314; 386/326
(58) Field of Classification Search ............... 369/53.35
See application file for complete search history.

(56) References Cited

U.S. PATENT DOCUMENTS

| 7,327,931 B2 * | 2/2008 | Frantz ...................... 386/249 |
| 2003/0014755 A1 * | 1/2003 | Williams ...................... 725/62 |
| 2007/0098351 A1 * | 5/2007 | East et al. ...................... 386/46 |

FOREIGN PATENT DOCUMENTS
CN 1700642 11/2005

OTHER PUBLICATIONS
"1st Office Action of China Counterpart Application" issued on Dec. 26, 2008, p. 1-p. 6.

* cited by examiner

*Primary Examiner* — Jamie Atala
(74) *Attorney, Agent, or Firm* — Jianq Chyun IP Office

(57) ABSTRACT

A method for recovering video data in a disk when a reading error occurs is provided. First, the disk is scanned to obtain a next writable address (NWA) of a last video chapter previously recorded into the disk. An end address of a successfully recorded video chapter is then read from a specific area of the disk and stored into a memory. Next, when a disk player/recorder is requested to read content of data according to the NWA, the disk player/recorder determines whether the content of the data is a file system. If the content of the data is not a file system, the NWA obtained by scanning the disk is replaced with the end address read from the specific area to read the file system, so as to recover the video data in the disk. Thereby, the video data in the disk can be protected.

17 Claims, 4 Drawing Sheets

METHOD FOR RECOVERING DATA IN DISK

CROSS-REFERENCE TO RELATED APPLICATION

This application claims the priority benefit of Taiwan application serial no. 96144111, filed on Nov. 21, 2007. The entirety of the above-mentioned patent application is hereby incorporated by reference herein and made a part of specification.

BACKGROUND OF THE INVENTION

1. Field of the Invention

The present invention generally relates to a disk recovery method, in particular, to a method for recovering video data in a disk when an error occurs during a disk reading process.

2. Description of Related Art

Along with the coming of the information era and the increasing quantity of digital data of various sources and formats, optical storage medium has become one of the most indispensable tools because of its characteristics such as large storage capacity, fast access speed, high portability, and easy storage.

Digital versatile disk (DVD) is a new generation optical information storage medium. A DVD offers much higher data density and capacity than a conventional compact disk (CD), and a DVD could be in a format of DVD-ROM, DVD-R, DVD-RW, DVD-RAM, DVD+R, or DVD+RW according to the application and manufacturer thereof. A user can easily record videos or data into a DVD by using a DVD burner installed in a computer system or a DVD recorder.

However, while recording a video into a disk, the video recording process may be terminated due to bad disk quality, disk defects caused by improper usage (for example, scratches or fingerprints), or an unexpected power failure during the video recording process. In this case, the video data recorded into the disk before the problem occurs becomes inaccessible.

To be specific, during video recording, the processing of a file system in a disk is different from that in a recording software. Except that the address of an initial file system is fixed when the disk is just initialized, the address of a file system is always determined according to the end address of a video chapter actually recorded into the disk before the disk is finalized. If the disk is used for recording another video next time, a data detection operation is first performed in order to obtain the file system last recorded into the disk, and the video is then recorded into the disk or the disk is finalized according to the data of this file system.

FIG. 1 is a diagram illustrating the data in a conventional write-once DVD. Referring to FIG. 1, when the write-once DVD is used for recording a video, whenever a video chapter (video chapter 110 or 120) is recorded, a file system (file system 130 or 140) is established after the end address of the video chapter for recording the related information of the video chapter so that later on the video chapter can be read and played by a DVD player/recorder.

However, while recording a video into a disk, the length of the video is usually determined by a user. Accordingly, the lengths and number of videos recorded in a disk are not confirmed before the disk is finalized. If an error occurs during a video recording process, the video recording process cannot be ended normally and accordingly the file system in the disk cannot be updated in time. As a result, the disk cannot be used for recording other videos and even the videos recorded in the disk before the error occurs cannot be recovered.

SUMMARY OF THE INVENTION

Accordingly, the present invention is directed to a method for recovering video data in a disk, wherein whenever a video chapter is successfully recorded into a disk, the next writable address (NWA) is recorded into a specific area of the disk or a non-volatile memory, and if an error occurs when reading a file system in the disk, the address information in the specific area or the non-volatile memory is used for replacing the original address used by a disk player/recorder to read the file system, so as to recover the video data in the disk.

The present invention provides a method for recovering video data in a disk when an error occurs while reading a file system in the disk. First, the disk is scanned to obtain the NWA information. Next, an end address of a video chapter previously successfully recorded into the disk is read from a specific area of the disk and stored into a system memory. After that, when a disk player/recorder is requested to read a length of data in the disk according to the NWA, the disk player/recorder first determines whether the content of the data is a file system. If the content of the data is not a file system, the end address previously obtained from the specific area is used for replacing the NWA obtained by scanning the disk to read the correct and valid file system, so as to recover the data in the disk. If the content of the data is a file system, a file system before the NWA is directly read from the disk.

According to an embodiment of the present invention, before obtaining the NWA of the video chapter previously recorded into the disk, the data recovery method further includes the following steps. The NWA of the video chapter is recorded into the system memory temporarily after the video chapter is recorded into the disk. Then, the NWA in the system memory is recorded into the specific area of the disk or a non-volatile memory after the video chapter is judged to be successfully recorded into the disk.

According to an embodiment of the present invention, the step of reading the specific area of the disk to obtain the end address of a previously successfully recorded video chapter includes reading the NWA information in the specific area of the disk and temporarily storing the information into the system memory and reading the information in the memory to obtain the NWA of the last successfully recorded video chapter.

According to an embodiment of the present invention, after the NWA of the last video chapter in the disk is obtained, the length of data before the NWA is read. After that, whether the data is a file system is determined. If the data is not a file system, the specific area of the disk or the non-volatile memory is read again to find the end address recorded when previously a video chapter is successfully recorded into the disk.

According to an embodiment of the present invention, the step of determining whether the data is a file system includes checking whether the data contains recognition characters. The data is determined to be the file system if the data contains recognition characters, and the data is determined not to be the file system if the data does not contain any recognition characters. If the data is determined to be the file system, the file system of the last video chapter is directly read to recover the video data in the disk. If the data is determined not to be the file system, the end address previously obtained from the specific area is used for replacing the NWA obtained by scanning the disk to read the file system of the video chapter corresponding to the end address, so as to recover the video data in the disk.

According to an embodiment of the present invention, the data recovery method further includes recording another video chapter after the NWA.

According to an embodiment of the present invention, the data recovery method further includes scanning the disk to record another video chapter after the NWA of the last data in the disk.

According to an embodiment of the present invention, the disk may be a digital versatile disk (DVD), a blu-ray DVD (BD), or a high-definition DVD (HD DVD). The specific area may be a lead-in area or a lead-out area of the disk.

The present invention provides a method suitable for recovering data in a disk when an error occurs while reading a file system in the disk. In this method, the end address of a successfully recorded video chapter is read, and a file system is read according to the end address, so as to recover the data in the disk.

According to the present invention, every time after a video chapter is successfully recorded into a disk, the end address of the video chapter is recorded into a specific area of the disk. If the video recording process is terminated by an unexpected power failure or a disk error, a disk player/recorder can recover the data previously recorded in the disk by reading the end address recorded in the specific area of the disk.

BRIEF DESCRIPTION OF THE DRAWINGS

The accompanying drawings are included to provide further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
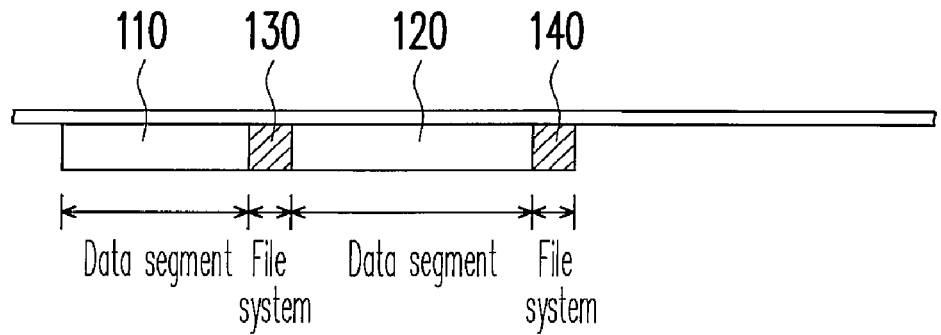
FIG. 1 is a diagram illustrating the data in a conventional write-once digital versatile disk (DVD).

Reference will now be made in detail to the present preferred embodiments of the invention, examples of which are illustrated in the accompanying drawings. Wherever possible, the same reference numbers used in the drawings and the description refer to the same or like parts.

Features, aspects, and advantages of the present invention will become more apparent from the following detailed description of embodiments of the present invention with reference to the accompanying drawings.

First Embodiment

Figure 2:
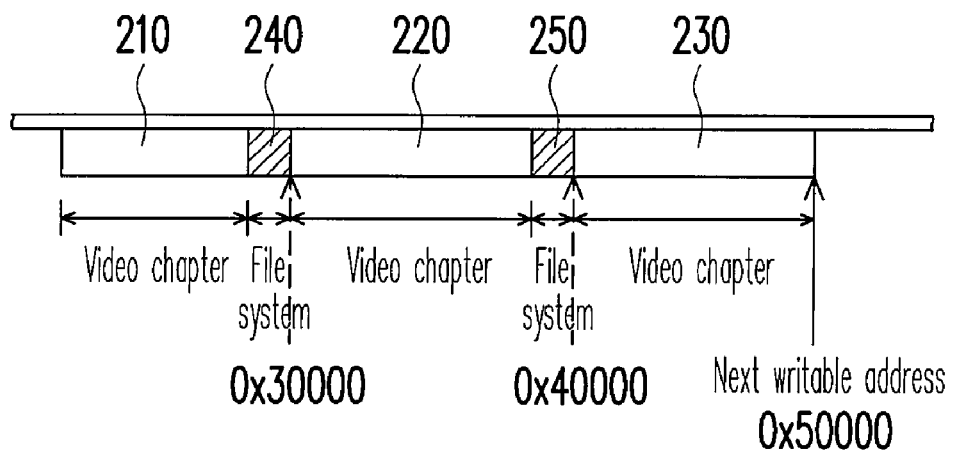
FIG. 2 is a diagram illustrating the data in a disk when a power failure occurs according to a first embodiment of the present invention.

FIG. 2 is a diagram illustrating the data in a disk when a power failure occurs according to the first embodiment of the present invention. Referring to FIG. 2, in the present embodiment, the disk is a digital versatile disk (DVD), and the data recorded in the disk includes data segments 210, 220, and 230 and file systems 240 and 250. As shown in FIG. 2, whenever a video chapter is recorded into the disk, the disk burner records a file system after the video chapter for recording the related information of the data segment. For example, the data segments 210 and 220 are respectively corresponding to the file systems 240 and 250. However, if a power failure occurs while the disk is being recorded, not only the recording of the video chapter 230 is not finished, but the file system of the video chapter 230 is not generated yet. Thus, when the disk is read next time, the data in the disk cannot be read correctly because the file system is not updated.

Generally speaking, a disk player/recorder includes a servo device and a back-end encoding/decoding device. After a video chapter is recorded, the servo device temporarily stores a next writable address (NWA) of the video chapter into a memory, and after the video chapter is judged to be recorded successfully, the servo device stores the end address of the video chapter into a specific area of the disk or a non-volatile memory. The specific area of the disk may be a lead-in area or a lead-out area of the disk, and the non-volatile memory may be an electrically-erasable programmable read-only memory (EEPROM). To be specific, when it is determined that a video chapter is successfully recorded into the disk, the servo device records the NWA stored in the memory into the specific area of the disk or the non-volatile memory as the end address of the video chapter. Accordingly, only the NWA of a successfully recorded video chapter is recorded into the specific area of the disk or the non-volatile memory.

Referring to FIG. 2, the NWA of the video chapter 210 is "0x30000", the NWA of the video chapter 220 is "0x40000", and the NWA of the video chapter 230 is "0x50000". Accordingly, the specific area of the disk or the non-volatile memory contains the end addresses "0x30000" and "0x40000" of the video chapters 210 and 220. The specific area of the disk does not contain the NWA "0x50000" of the video chapter 230 since the recording of the video chapter 230 is not successful.

Thereby, if power failure or a disk error occurs during a video recording process, a disk player can recover the data in the disk according to an end address previously recorded in a specific area of the disk when the disk is inserted into the disk player/recorder again. Based on the foregoing concept, a method for recovering data in a disk when an error occurs while reading the data from the disk will be described with reference to another embodiment of the present invention.

Second Embodiment

Figure 3:
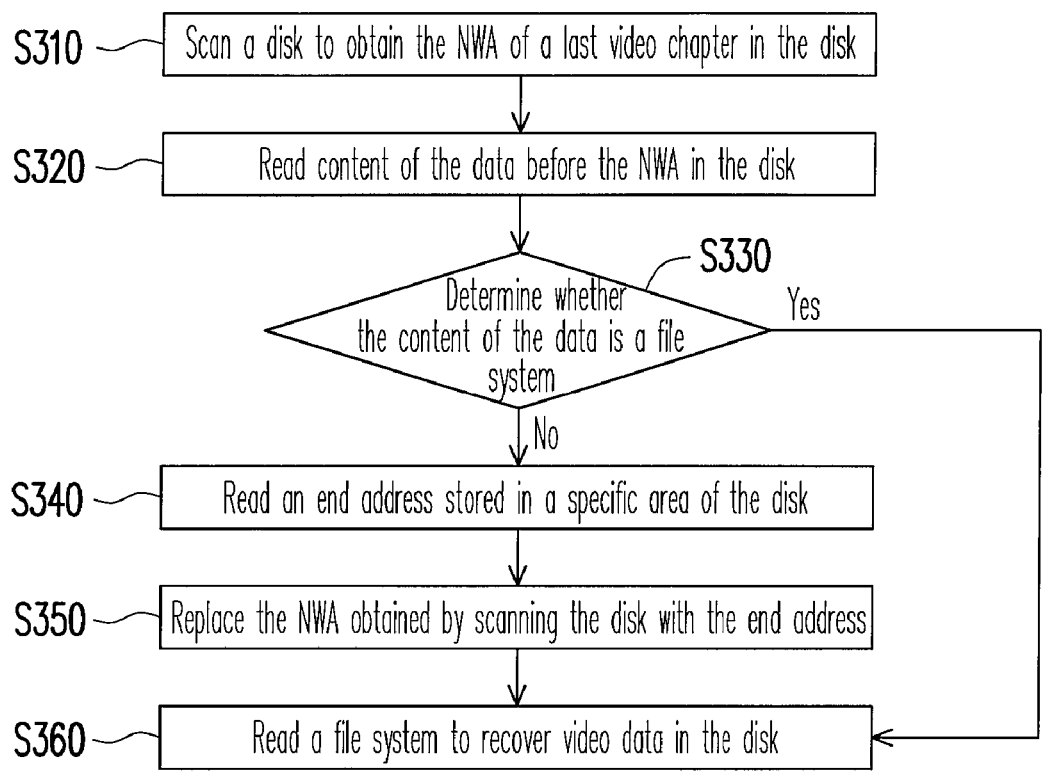
FIG. 3 is a flowchart illustrating a method for recovering data in a disk according to a second embodiment of the present invention.

FIG. 3 is a flowchart illustrating a method for recovering data in a disk according to the second embodiment of the present invention. Referring to both FIG. 2 and FIG. 3, the present embodiment provides a method for recovering data when a disk player/recorder reads the data from a disk. First, the disk player/recorder scans the disk to obtain the NWA of a $(N+1)^{th}$ data in the disk (step S310). Next, the disk player/recorder reads a sectional data before the NWA of the $(N+1)^{th}$ data in the disk (step S320) and determines whether the data is a file system (step S330). Whether the data is the file system is determined by checking whether the data contains recognition characters.

As shown in FIG. 2, the NWA of the $(N+1)^{th}$ data in the disk is the end of the video chapter 230 (for example, "0x50000"). If the video chapter 230 is a successfully recorded video chapter, a file system recording the related information of the video chapter is recorded right after the video chapter, and the NWA of the video chapter 230 is recorded into a specific area of the disk or a non-volatile memory as the end address of the video chapter 230. Accordingly, when the disk player/recorder is requested to read the NWA "0x50000", the disk player/recorder determines whether the content of the data before the NWA "0x50000" contains recognition characters (for example, image data recognition characters 'R', 'S', 'A', 'T') so as to determine whether the file system of the video chapter 230 exists. If the content of the data before the NWA "0x50000" contains the recognition characters, the data is determined to be the file system, namely, the video chapter 230 is successfully recorded; otherwise, if the data before the NWA "0x50000" does not contain the recognition characters, the data is determined not to be the file system, namely, the recording of the video chapter 230 fails.

Referring to FIG. 3, in step S330, when the data is determined to be the file system, the file system corresponding to the video chapter is directly read to recover the data in the disk (step S360). On the other hand, if the content of the data before the NWA is determined not to be the file system in step S330, the end address stored in the specific area of the disk or the non-volatile memory is read to obtain the end address of the $N^{th}$ successfully recorded video chapter (step S340), for example, the end address "0x40000" of the video chapter 220. In practice, the disk player/recorder may temporarily store the end address into a memory when it just starts to read the disk so that the disk player/recorder can directly read the end address from the memory when it is requested to read previous end addresses (for example, end addresses of $N^{th}$ video chapter, $(N-1)^{th}$ video chapter, $(N-2)^{th}$ video chapter . . . ).

After the end address of the previously successfully recorded video chapter 220 is obtained, the disk player replaces the NWA "0x50000" of the video chapter 230 obtained by scanning the disk with this end address "0x40000" and reads a file system before the end address "0x40000", so as to recover the data in the disk (step S350). In other words, originally, the disk player/recorder should read the file system at the NWA "0x50000" for recovering the data in the disk, but since the data before the NWA "0x50000" is not a file system, the disk player/recorder uses the end address "0x40000" read from the specific area of the disk or the non-volatile memory for reading the file system instead.

It should be noted that in the present embodiment, if the disk is to be used for recording another video chapter, the disk player/recorder records another video chapter after the NWA "0x50000" obtained by scanning the disk. In other words, data still can be recorded into a normal area of the disk even though the video chapter 230 is not completely recorded.

However, in our daily life, a disk may be damaged (for example, scratched) or have bad quality, which may cause some video chapters in the disk to be unreadable. In this case, the undamaged data in the disk can still be read by using the end address, and this will be described below with reference to another embodiment of the present invention.

Third Embodiment

Figure 4:
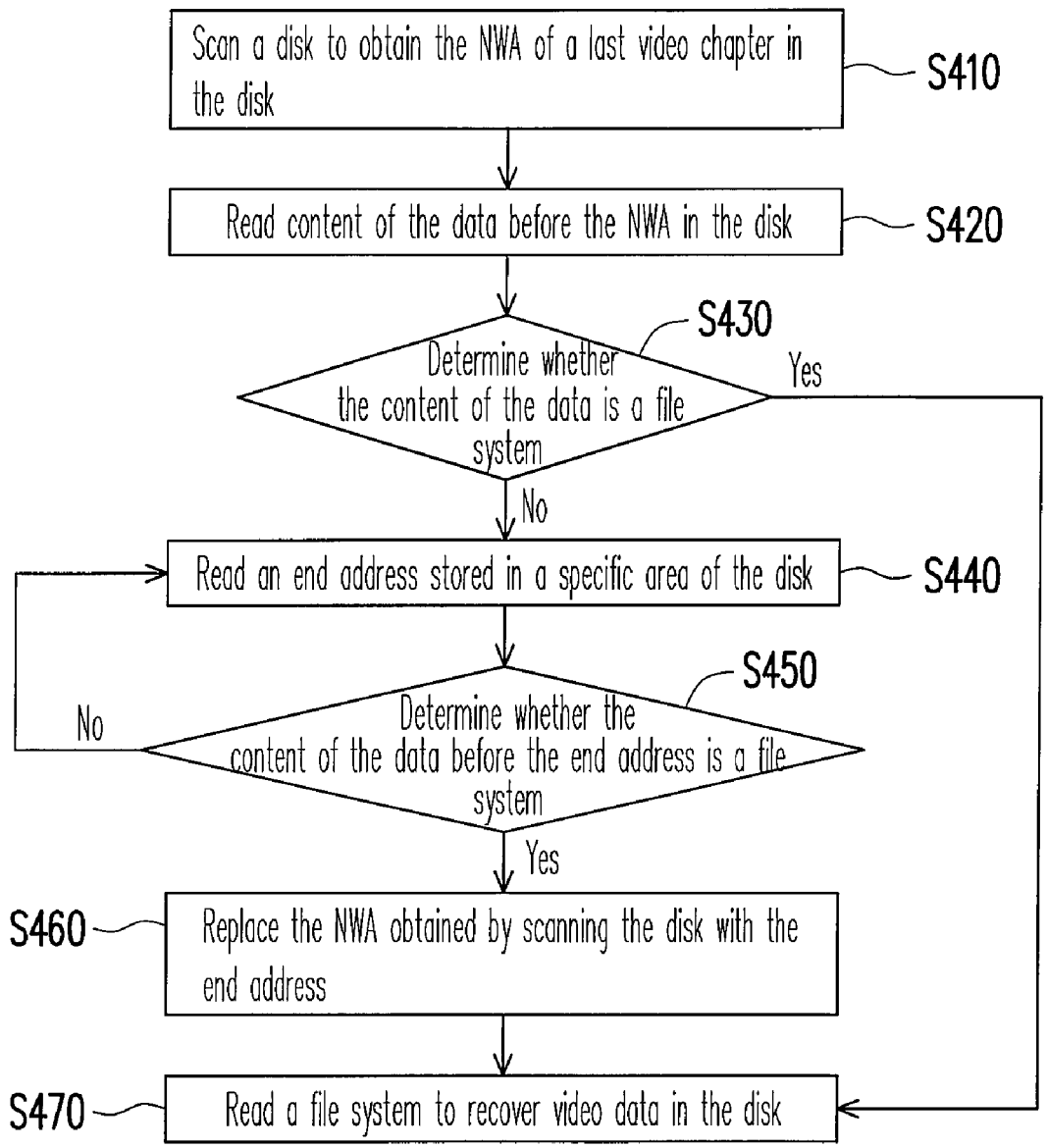
FIG. 4 is a flowchart illustrating a method for recovering data in a disk according to a third embodiment of the present invention.

FIG. 4 is a flowchart illustrating a method for recovering data in a disk according to the third embodiment of the present invention. Referring to both FIG. 2 and FIG. 4, the steps S410~S440 in the present embodiment are the same as the steps S310~S340 in the foregoing embodiment. First, the disk player/recorder scans the disk and obtains the NWA of the $(N+1)^{th}$ video chapter in the disk (step S410). Then the disk player/recorder reads data before the NWA (step S420) and determines whether the data is a file system (step S430). If the data is determined not to be a file system, the disk player/recorder reads the end address of an $N^{th}$ successfully recorded video chapter stored in a specific area of the disk or a non-volatile memory and replaces the NWA of the $(N+1)^{th}$ video chapter with the end address of the $N^{th}$ successfully recorded video chapter (step S440). On the other hand, if the data is determined to be a file system, the disk player/recorder directly reads the file system of the $(N+1)^{th}$ video chapter to recover the data in the disk (step S470).

The difference of the present embodiment from the previous embodiment is that after step S440, it is further determined whether the data before the end address of the previously successfully recorded video chapter recorded in the specific area of the disk or the non-volatile memory is a file system (step S450). If the data is determined not to be a file system, the process returns to step S440 and the disk player/recorder reads the specific area of the disk or the non-volatile memory again to find the end address of the $(N-1)^{th}$ successfully recorded video chapter in the disk. In other words, if the file system of the previously successfully recorded video chapter in the disk is damaged and cannot be read, the end address recorded in the specific area of the disk or the non-volatile memory is read again in order to look forwards for the end address of the $(N-1)^{th}$ successfully recorded video chapter in the disk and accordingly read the undamaged file system and the corresponding video chapter in the disk; and accordingly, if the file system of the $(N-1)^{th}$ video chapter cannot be read due to a disk defect, the end address of the $(N-2)^{th}$ video chapter will be further looked for.

In step S450, if the content of the data before the end address obtained from the address information in the specific area of the disk or the non-volatile memory is a file system, this end address is used for replacing the NWA obtained by scanning the disk to read the file system corresponding to the video chapter at this end address, so as to recover the data in the disk (step S460).

As shown in FIG. 2, after the NWA "0x40000" is obtained, whether the data before the NWA "0x40000" is a file system is determined. If so, the NWA "0x40000" is used for replacing the NWA "0x50000" of the last video chapter in the disk to read the file system, so as to recover the data in the disk. If the file system 250 of the NWA "0x40000" is damaged and cannot be read, the specific area of the disk or the non-volatile memory is read again to look forwards for the end address "0x30000" which was recorded when a previous data was successfully recorded into the disk, so as to read the file system before the NWA "0x30000".

In overview, in the embodiments described above, when an error occurs while reading data from a disk, the undamaged data in the disk can be recovered by using an end address stored in a specific area of the disk or a non-volatile memory. On the other hand, according to the present invention, the foregoing step of disk scanning can be skipped and the file system can be directly read according to previously recorded writable address information. This will be described below with reference to another embodiment of the present invention.

Fourth Embodiment

Figure 5:
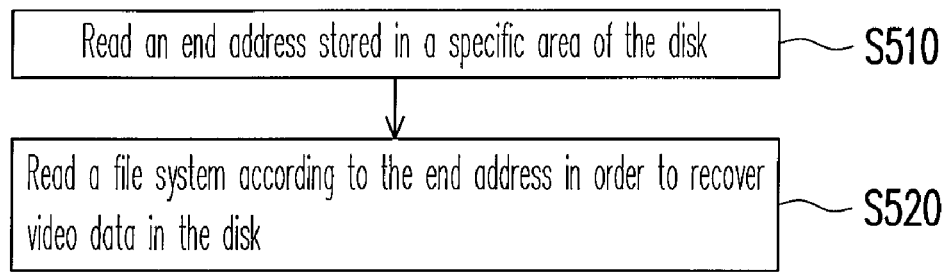
FIG. 5 is a flowchart illustrating a method for recovering data in a disk according to a fourth embodiment of the present invention.

FIG. 5 is a flowchart illustrating a method for recovering data in a disk according to the fourth embodiment of the present invention. Referring to both FIG. 2 and FIG. 5, in the present embodiment, the disk player/recorder directly reads an end address stored in a specific area of the disk or a non-volatile memory (step S510) and reads a file system according to this end address, so as to recover the data in the disk (step S520). In other words, since all the end addresses recorded in the specific area of the disk or the non-volatile memory are the NWAs of successfully recorded data segments, in the present embodiment, these correct and valid NWAs are directly used for reading the file system so that the step of disk scanning is skipped.

For example, as shown in FIG. 2, since the video chapter 230 is not successfully recorded, only the end addresses of the data segments 210 and 220 are recorded in the writable address information in the lead-in area or lead-out area of the disk or the non-volatile memory. When the disk player/recorder reads data from the disk, the disk player/recorder directly reads the writable address information to obtain the end address "0x40000" of the video chapter 220 and read the file system 250, so as to recover the data in the disk. Accordingly, the speed for reading data from the disk is increased.

It should be noted that if this disk is used for recording other data, the disk player/recorder records another video chapter after the NWA of the last video chapter obtained by scanning the disk. As shown in FIG. 2, the disk player/recorder records another video chapter after the NWA "0x50000".

Additionally, when the disk is scratched or damaged so that some video chapters in the disk cannot be read, the undamaged data in the disk can still be recovered by using the writable address information.

Fifth Embodiment

Figure 6:
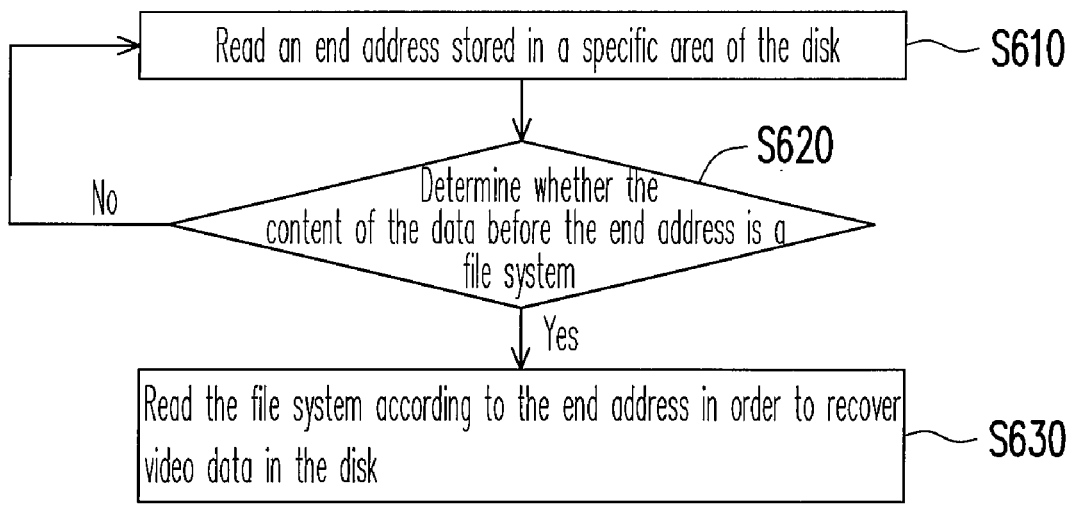
FIG. 6 is a flowchart illustrating a method for recovering data in a disk according to a fifth embodiment of the present invention.

FIG. 6 is a flowchart illustrating a method for recovering data in a disk according to the fifth embodiment of the present invention. Referring to FIG. 6, first, the disk player directly reads an end address stored in a specific area of the disk or a non-volatile memory (step S610).

The difference of the present embodiment from the foregoing embodiments is that after the end address is obtained, whether content of the data before the end address is a file system is further determined (step S620). If so, the file system is read according to the end address to recover the video data in the disk (step S630); otherwise, if the content of the data before the end address is not a file system, namely, the previously successfully recorded video chapter is damaged and cannot be read, the process returns to step S610 and the specific area of the disk or the non-volatile memory is read again to look forwards for the end address recorded when a previous data was successfully recorded in the disk, so as to read the undamaged data segments in the disk.

As shown in FIG. 2, after the video chapter at the NWA "0x40000" is read, whether the data is a file system is determined. If so, a file system is read according to the NWA "0x40000" so as to recover the data in the disk. If the file system 250 is damaged and cannot be read, the end address "0x30000" recorded in the specific area of the disk or the non-volatile memory is read. Similarly, it is determined that whether the data before the end address "0x30000" is a file system, and so on.

In overview, in the present invention, if an error occurs while reading data from a disk, an end address recorded in a specific area of the disk is used for replacing a NWA obtained by scanning the disk to read a file system, so as to recover the data in the disk. Alternatively, while reading the disk, the end address may be directly read from the specific area of the disk or the non-volatile memory to read the file system, so that the speed and accuracy for reading data from the disk are both increased.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A method for recovering video data in a disk, suitable for recovering the video data in the disk when an error occurs, the method comprising:
   scanning the disk to obtain a next writable address (NWA) of a last recorded video chapter in the disk;
   reading content of data before the NWA of the last recorded video chapter;
   determining whether the data is a file system;
   if the data is not the file system, reading an end address of a previous successfully recorded video chapter; and
   replacing the NWA of the last video chapter with the end address of the previous successfully recorded video chapter to read the file system, so as to recover the video data in the disk.

2. The method according to claim 1 further comprising:
   storing the end address of the video chapter into a specific area of the disk or a non-volatile memory after the video chapter is successfully recorded into the disk.

3. The method according to claim 2, wherein the specific area comprises a lead-in area or a lead-out area, and the non-volatile memory comprises an electrically-erasable programmable read-only memory (EEPROM).

4. The method according to claim 2, wherein before the video chapter is successfully recorded, the method comprises:
   temporarily storing the NWA of the video chapter into a memory after the video chapter is recorded.

5. The method according to claim 2, wherein after reading the end address of the successfully recorded video chapter, the method comprises:
   reading the data before the NWA;
   determining whether the data is the file system; and
   reading the specific area or the non-volatile memory again to find an end address of another successfully recorded video chapter if the data is not the file system.

6. The method according to claim 1, wherein the step of determining whether the video chapter is the file system comprises:
   checking whether the data comprises recognition characters;
   determining the data is the file system if the data comprises the recognition characters; and
   determining the data is not the file system if the data does not comprise the recognition characters.

7. The method according to claim 1, wherein after determining whether the video chapter is the file system, the method further comprises:
   reading the file system to recover the video data in the disk if the data is the file system.

8. The method according to claim 1 further comprising:
   recording another video chapter into the disk after the NWA of the last video chapter.

9. The method according to claim 1, wherein the disk comprises a digital versatile disk (DVD), a blue-ray DVD (BD), or a high-definition DVD (HD DVD).

10. A method for recovering video data in a disk, suitable for recovering the video data in the disk when a reading error occurs, the method comprising:
    reading an end address of a successfully recorded video chapter; and
    reading a file system according to the end address to recover the video data in the disk.

11. The method according to claim 10, wherein before reading the end address of the video chapter, the method further comprises:
recording the end address of the successfully recorded video chapter into a specific area of the disk or a non-volatile memory.

12. The method according to claim 11, wherein before reading the end address of the video chapter, the method comprises:
temporarily storing the end address of the video chapter into a memory after the video chapter is recorded; and
recording the end address stored in the memory to the specific area of the disk or the non-volatile memory after the video chapter is successfully recorded.

13. The method according to claim 11, wherein after reading the end address of the video chapter, the method further comprises:
reading data before the end address of the video chapter;
determining whether the data is the file system; and
reading the specific area of the disk or the non-volatile memory again to find an end address of another video chapter successfully recorded in the disk if the sectional data is not the file system.

14. The method according to claim 13, wherein the step of determining whether the video chapter is the file system comprises:
checking whether the data comprises recognition characters;
determining that the data is the file system if the data comprises the recognition characters; and
determining that the data is not the file system if the data does not comprise the recognition characters.

15. The method according to claim 13, wherein after determining whether the video chapter is the file system, the method further comprises:
reading the file system to recover the video data in the disk if the data is the file system.

16. The method according to claim 11, wherein the specific area comprises a lead-in area or a lead-out area of the disk, and the non-volatile memory comprises an EEPROM.

17. The method according to claim 10, wherein the disk comprises a DVD, a BD, or a HD DVD.

* * * * *